United States Patent [19]

Mathauser

[11] 4,418,489
[45] Dec. 6, 1983

[54] STRIKE SIGNALLING APPARATUS FOR A FISHING ROD

[76] Inventor: William R. Mathauser, 3000 "B" Ave., Anacortes, Wash. 98221

[21] Appl. No.: 266,979

[22] Filed: May 26, 1981

[51] Int. Cl.³ .......................................... A01K 97/12
[52] U.S. Cl. .................................................... 43/17
[58] Field of Search ...................... 43/17; 33/DIG. 13

[56] References Cited

U.S. PATENT DOCUMENTS 2,487,681 11/1949 Weisselberg ................. 33/DIG. 13
3,820,268 6/1974 Newton ................................. 43/17
4,051,616 10/1977 Mathauser ............................ 43/17
4,154,015 5/1979 Holland ................................ 43/17
4,160,325 7/1979 DeNicola ..................... 33/DIG. 13
4,294,015 10/1981 Drouin et al. ................ 33/DIG. 13

Primary Examiner—Nicholas P. Godici
Assistant Examiner—M. Jordan
Attorney, Agent, or Firm—Shoemaker and Mattare, Ltd.

[57] ABSTRACT

Apparatus for alerting the fisherman includes a strain gauge to sense the amount of deflection undergone by a fishing rod. The apparatus includes a housing removably attached to the fishing rod.

20 Claims, 8 Drawing Figures

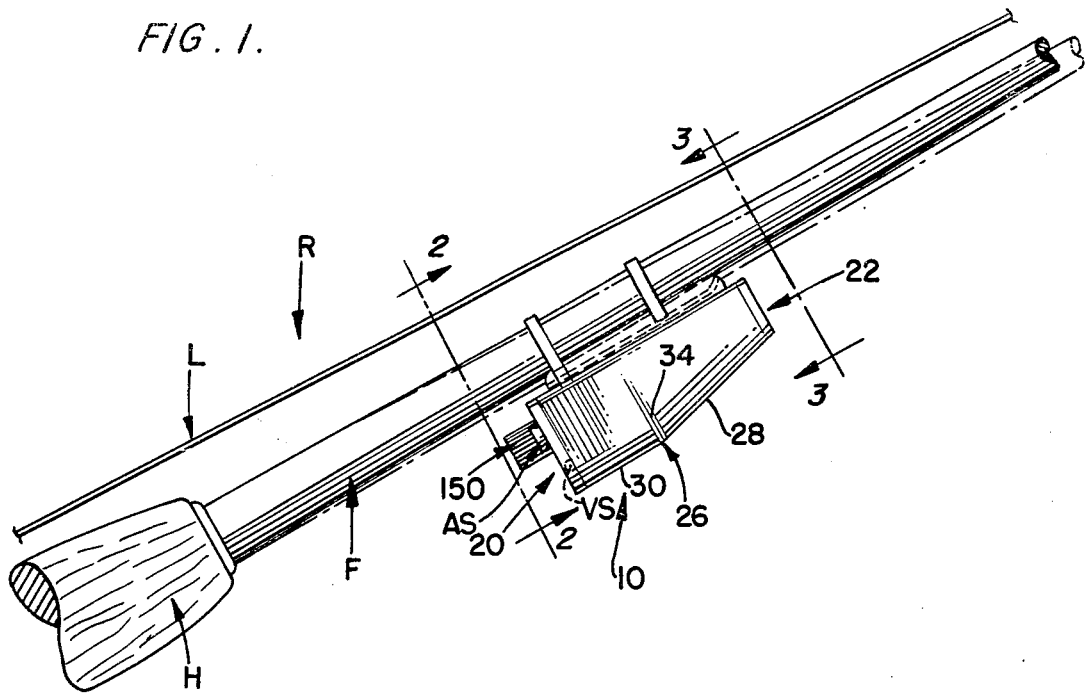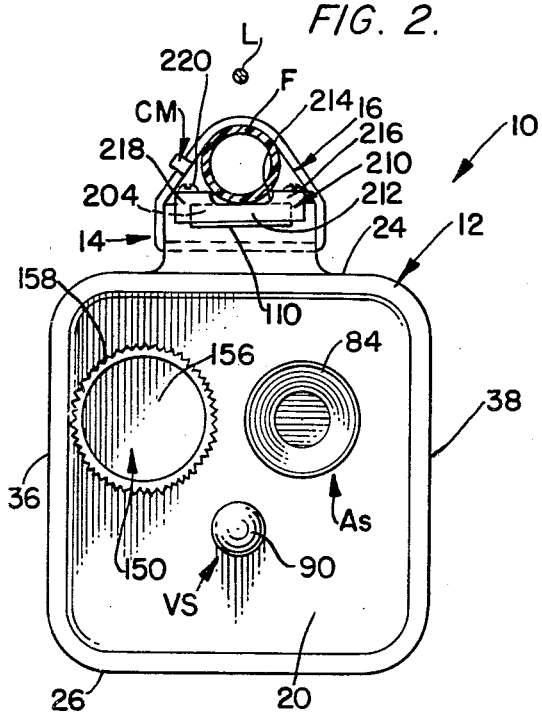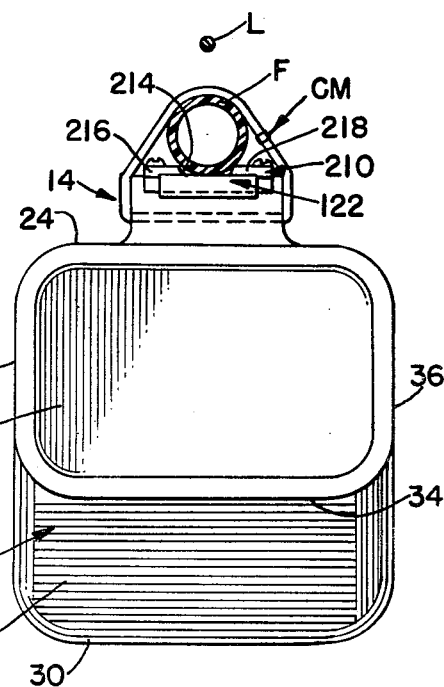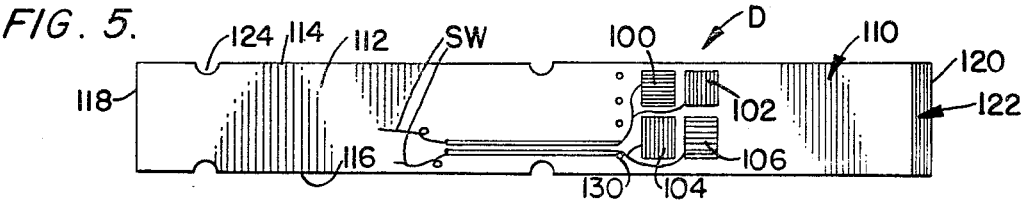

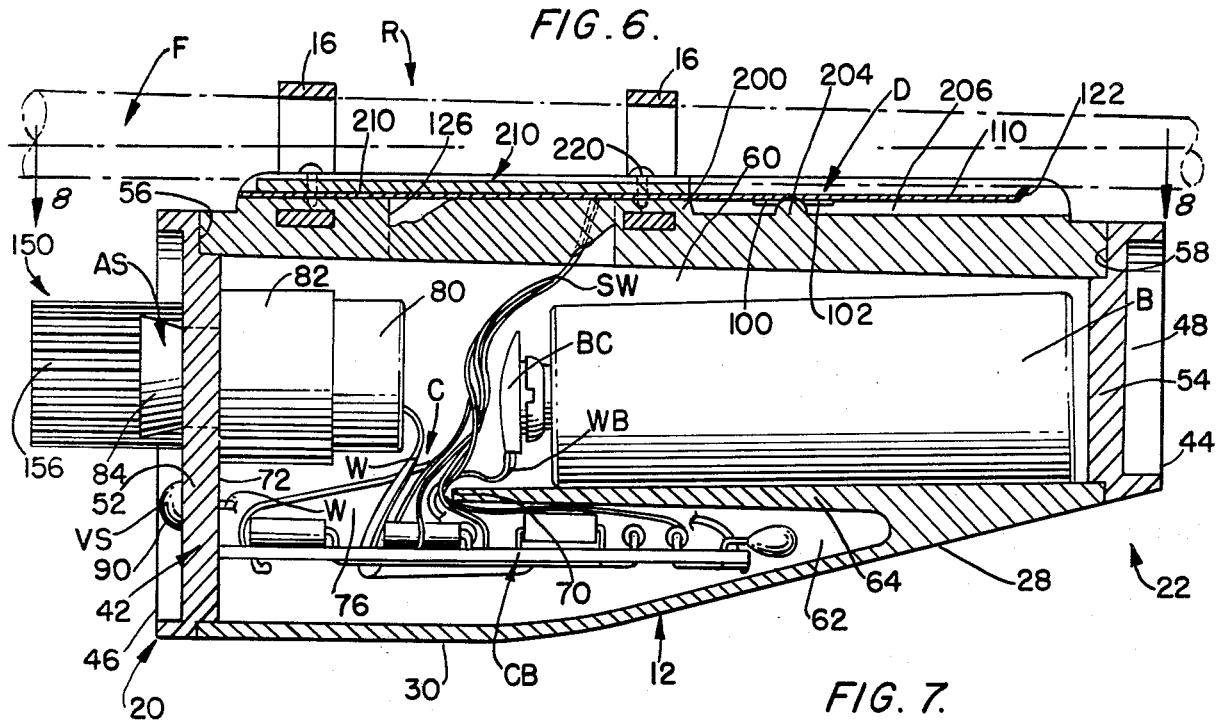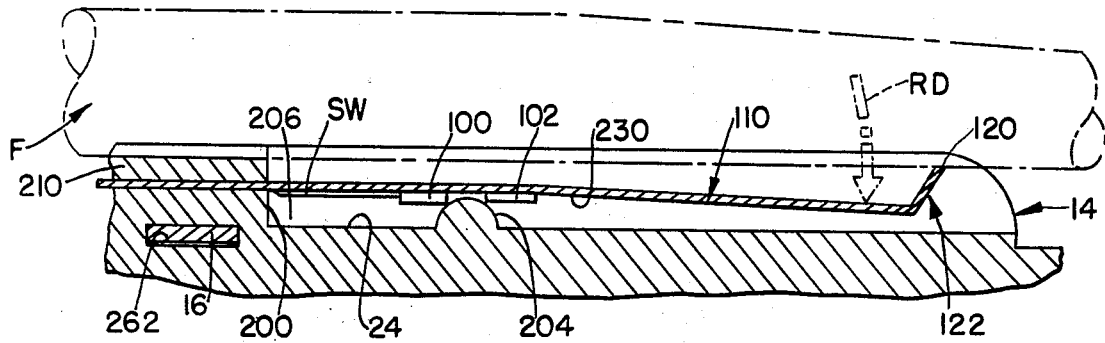

STRIKE SIGNALLING APPARATUS FOR A FISHING ROD

BACKGROUND OF THE INVENTION

The present application in general relates to fishing equipment, and, in particular, relates to fishing rods with strike signalling apparatus.

As every fisherman known, there is only one proper, or "ideal" time to set the hook after a fish has struck the bait. This "ideal" time varies with each individual fisherman, and further varies according to the conditions, type of fish and numerous other factors. It is often the case, especially with novice fishermen, that such "ideal" time is often missed, and the fish is able to escape. It goes without saying that such situations are disappointing and frustrating. Such situations may even occur with expert fishermen who may have temporarily released the fishing rod, or whose attention is otherwise temporarily diverted. For example, in trolling, the fishing rods are mounted on a boat, and the attention of the fisherman must be divided between steering the boat and the fishing rod. This is often quite difficult, and strikes can often be missed, even by an expert fisherman.

Heretofore, the "ideal" time to set the hook has been "sensed" by the fisherman. Of course, an expert fisherman has a developed sense of feel which is very sensitive as compared to a novice fisherman. However, even such expert fisherman may miss the ideal time if his attention is diverted. Hence, to overcome this problem, there are several types of strike signalling systems presently available. However, as will be discussed below, all of the systems suffer from similar disadvantages of inconsistent signalling, inaccurate signalling, and unreliable operation. Furthermore, these systems are almost impossible to alter so that they can be adapted to different situations, and often interfere with the balance and control of the rod.

An example of such systems are those devices which employ a bell on the rod that rings when a fish strikes. However, in addition to the other drawbacks, such devices suffer from the disadvantage that, as the prey is reeled in, the bell is constantly ringing, and the fisherman is subjected to the cacophony of the bell while he is reeling in the fish. Furthermore, such devices, in addition to being inaccurate, often completely fail to signal a strike at all.

Still other devices utilize electronic circuitry to monitor a fishing rod. Such devices generally have normally open switches mounted on the outside of the rod, which switches are closed when the rod flexes. Such exteriorly mounted switches are exposed to the environment and thus dirt, salt, moisture, or the like may cause malfunctioning or jamming of the switches. The jamming can be caused by dirt entering the switch, or by the rusting of some of the parts of the switch, or the like. In any event, such switches generally become unreliable and inaccurate after some period of use.

If the switches do not completely jam, they often become inaccurate. But worse than this, the switches tend to provide inconsistent operation, as the flexing which closes the switch when the switch is clean may not close it when the switch is dirty. Thus, a fisherman has no reliable way of setting the switch so that he will be assured of being notified when it has proven most useful to him after a fish has taken the hook in the manner which the fisherman deems to be a strike, i.e., the "ideal" time to set the hook. Thus, a previous setting may not be reliably used to set the alarm system for larger or smaller fish, or even held constant for the same size fish, due to the inconsistent switch closing characteristics.

Often, the sensitivity of the known switches cannot be varied. Thus, once set, the devices may prove to be useless for fish smaller, or larger, than the setting reference. To change the settings of known systems, elements of the system often must be replaced, a difficult and often expensive procedure.

The present inventor has disclosed, in U.S. Pat. No. 4,051,616, a signalling device which is mounted in a rod, and a device which includes a strain gauge mounted on the rod. The disclosure of this prior patent, U.S. Pat. No. 4,051,616, is incorporated into the present disclosure by reference thereto.

The prior device is very effective, but is permanently mounted on the fishing rod. In other words, this prior device is not as versatile as it could be because, once applied to a rod, it cannot be easily removed and applied to another rod. If a fisherman desires to fish under several conditions, i.e., trolling, spin, surface, or the like, he must purchase a rod equipped with the signalling device for each type of fishing. In effect, that fisherman is purchasing a separate signalling device for each type of fishing. As the signalling device performs the same function and operation in all instances, such multiple purchases are redundant.

Accordingly, there is need for a versatile signalling device which has the advantages of the device disclosed in the referenced patent, without the drawbacks of that device.

SUMMARY OF THE INVENTION

The signalling device embodying the teachings of the present invention is detachably mounted on a fishing rod at a location suitable to the needs of a individual fisherman. The device includes strain gauges contacting the fishing rod and a zeroing means for adjusting the amount of rod deflection required to activate an alerting means.

The unit includes a housing, or case, that can be referred to as the "body", which includes an on-off switch and potentiometer. The body also houses a power source, such as a 9 volt battery, or the like, a pc board, which contains various circuits required to operate the device, along with an I.C., and other necessary components. Bridge circuits or the like can be included and are set to complete the circuit from the power source to the alerting means when the strain gauge senses sufficient deflection. A front cover of the body accommodates a sounder or speaker, and a light which can be an L.E.D. that also lights up at the same time the speaker is sounded. The potentiometer adjusts the circuit to complete that circuit for various pressures, as imposed on the strain gauge from the deflection of the fishing rod. When the deflection exceeds the setting as chosen by tuning of the potentiometer, the speaker and the L.E.D. are operated.

The device is positioned on the fishing rod near the butt or handle and strap-ties hold that device firmly against the rod. The device is supported near the butt end or handle end of the rod by a rod seat, which keeps it in general alignment. At the forward end of the device, the gauge, or the gauge support leaf and gauge, comes into contact with rod because of a bend at the tip of that leaf. The leaf is free-floating, and will be bent with any deflection imposed upon it by the rod. In order to amplify any movement or deflection of the rod, the gauges are supported at the center of the leaf or the leaf is pivoted over the center thereof by an arcuate, preferably semi-circular, member that is part of the device case. This pivot member acts as a teeter-totter pivot point, and amplifies the bending or deflection of the gauge leaf and thus the gauges, thereby amplifying the sensitivity of the gauges.

If the rod is in a static position, with no forces imposed on it, the unit is turned on and the potentiometer brought up to the point where the L.E.D. and the sound is activated. If the potentiometer is then tuned slightly down, the L.E.D. and the speaker are no longer active. Yet, as long as the device is turned on, and brought to the degree of sensitivity just slightly less than the activation of the speaker, and L.E.D., it is continually monitoring but not alerting. The slightest movement of the rod or any tug regardless of how slight will deflect or bend the strain gauges and in turn activate the alerting means. This sensitivity can be controlled to any desired degree of accuracy, even to just a few millionths of an inch.

If a fisherman is trolling with relatively heavy gear on the rod, and a decisive bend is generated, the potentiometer is operated and tuned to compensate for that deflection. Any added deflection will instantly activate the device.

The present unit is readily transferred from rod to rod, and can be used or taken off the rod at the owner's discretion.

It is also noted that the present device can be placed on any flexing portion of a fishing rod where sensitivity is most evident. In other words, on a very heavy rod, such as a swordfish rod, it would be advantageous to place the unit out near the tip to monitor the rod's flexibility in that area. In such a heavy rod, any bend of the handle would be virtually negligible. This capability and versatility in positioning provides great flexibility and versatility to the device embodying the teachings of the present invention.

OBJECTS OF THE INVENTION

It is a main object of the present invention to provide a strike signalling system which can be used with a variety of fishing rods.

It is another object of the present invention to provide a strike signalling system which is removably attached to a fishing rod.

It is a further object of the present invention to provide a strike signalling system having a variable degree of accuracy and delay time.

These together with other objects and advantages which will become subsequently apparent reside in the details of construction and operation as more fully hereinafter described and claimed, reference being had to the accompanying drawings forming part hereof, wherein like reference numerals refer to like parts throughout.

BRIEF DESCRIPTION OF THE DRAWINGS

FIG. 1 is an elevation side view of a fishing rod having attached thereto the device embodying the teachings of the present invention.

FIG. 2 is a view taken along line 2—2 of FIG. 1.
FIG. 3 is a view taken along line 3—3 of FIG. 1.

FIG. 4 is an elevation side view of a strain gauge supporting system used in the device embodying the teachings of the present invention.

FIG. 5 is a bottom plan view of the device shown in FIG. 4.

FIG. 6 is a cut away elevation view of the device embodying the teachings of the present invention.

FIG. 7 is a partial view of the strain gauge mounting system abutting a fishing rod in accordance with the teachings of the present invention.

FIG. 8 is a view taken along line 8—8 of FIG. 6.

DETAILED DESCRIPTION OF THE INVENTION

Shown in FIG. 1 is a portion of a fishing rod R having a handle H which has a flexible rod portion F mounted thereon in a known manner. A fishing line L is also associated with the rod by eyes and a reel (not shown). A signalling device 10 is removably attached to the rod R at a suitable location selected by the fisherman according to considerations such as rod balance, access, rod size, or the like.

The signalling device is the subject of the present disclosure, and includes a hollow housing 12 having a channel-like rod contacting mounting section 14 on one side thereof, and a mounting means, such as strap 16, releasably securing the device 10 to the rod. The straps can include operable coupling mechanisms CM, such as buckles, clasps, clamps, or the like, whereby these straps releasably encircle the rod to detachably attach the device 10 to the rod. The housing protects any elements housed therein from environmental conditions, such as dirt, moisture, or the like. Such environmental conditions may cause the device 10 to be inconsistent if such protection were not provided.

The housing 12 is, in the preferred embodiment, roughly pentagonal with a major end 20, a minor end 22, a planar base 24, an angled top 26 having planar portions 28 and 30 intersecting at junctions 34, and planar sides 36 and 38. The ends 20 and 22 are formed by end caps 42 and 44 having counterbores 46 and 48, respectively, defined therein. The end caps include bosses 52 and 54, respectively, which are inset from the perimeters of the end caps to define shoulders 56 and 58 which abut the rims of the top, sides and base of the housing. The bosses are sized to frictionally, but releasably, engage these housing elements so the end caps can be removed to provide access to the interior of the hollow housing.

As best shown in FIG. 6, the housing 12 has a major chamber 60 and a minor chamber 62 separated by partition 64 integrally attached to top portion 28 and extending toward the major end 20 but stopping short thereof so that end edge 70 of the partition is spaced from inner surface 72 of the major end boss 52 to define gap 76 therebetween.

The major chamber houses battery B therein while the minor chamber houses a circuit board CB therein. The circuit board is mounted on the end cap 42, and the battery is supported on the partition. As shown in FIGS. 2 and 6, the device 10 includes an audio signal means AS and a visible signal means VS. The audio signal includes a horn 80 mounted on the major end cap 42 by a sleeve 82 and includes a megaphone portion 84 located outside the housing. The video portion includes a light, such as L.E.D. 90, mounted on the end cap 42. Both the horn and the light are electrically connected to the battery via circuit C on the circuit board in a manner to be discussed below by leads, such as wires W and WV. The battery is connected to the circuit C via leads, such as wires WB and battery cap BC.

As is the case in the referenced patent, U.S. Pat. No. 4,051,616, the signalling device 10 includes a means D for detecting deflection of the rod R as the means for completing circuit C between the power source, battery B, and the indicators AS and/or VS. The deflection detecting means D includes at least one strain gauge which is coupled to the rod R in a manner so that deflection of the rod is sensed by that strain gauge.

FIGS. 4 and 5 illustrate the preferred form of the strain gauge means of the present invention. The strain gauge means includes four strain gauges, 100, 102, 104 and 106, mounted on a resilient gauge leaf 110. The gauge leaf is elongate and includes a planar body 112, side edges 114 and 116, and end edges 118 and 120. As shown in FIG. 4, end 120 is bent away from the strain gauges to define a feeler 122. Notches 124 are defined in the side edges for a purpose which will be apparent from the ensuing discussion, and a slot 126 is defined in housing 12 to accommodate the strain gauge wires, as will also be apparent from the ensuing discussion. Electrical leads, such as wires SW, attach the strain gauges to the circuit C and are mounted on the leaf 110 by spot welds 130, or the like. As shown in FIG. 5, the strain gauges are orthogonally oriented with respect to each other, but other orientations can be used without departing from the scope of the present invention.

As can be seen in FIG. 6, the strain gauges are connected to the signal means AS and VS and to the battery B via the circuit C and the appropriate leads. The circuit C, as well as the electrical setup, are disclosed in the referenced patent, and are the means usual to such strain gauge setups. Examples of electrical setups appropriate to strain gauges are disclosed in standard texts, and thus will not be discussed herein, reference being made to such disclosures for such teachings. Such setups usually include some form of Wheatstone Bridge, or the like, which is unbalanced by the strain gauges; and once unbalanced, completes the circuit between a power source and an alarm, thereby activating that alarm. As can be seen in the figures, the strain gauges and mounting leaf are protected by the mounting section 14 and the leaf 110 and thus are protected from damage due to dirt, moisture, or the like.

A switch means 150 is mounted on the major end cap adjacent the horn and L.E.D. The switch 150 also includes a sensitivity adjusting means, such as a potentiometer or the like, electrically connected to the circuit C and the battery B. The sensitivity of the strain gauges is adjusted by the switch 150 which includes a knob 156 having knurling 158 thereon. The knob is turned clockwise or counterclockwise to adjust the sensitivity of the strain gauges via the potentiometer. The knob has the switch means thereof connected thereto to act as an on-off switch so that the circuit is completed or interrupted in the manner of such on-off switches when the knob is turned to a predetermined radial orientation with respect to the end cap.

As best shown in FIGS. 6, 7 and 8, the rod mounting section 14 includes a mounting base 200 integrally formed on the base 24 of the housing to extend longitudinally of that housing. A crown bar 204 extends transversely of the housing at a location spaced from the mounting base 200 for a purpose to be described below. A channel 206 is thus defined distally adjacent the base 200 by the sides of the channel-like base 14 and the distal end of the base 200. An elongate rod seating plate 210 is best shown in FIGS. 2 and 3 and includes a base 212 having a rod receiving channel 214 defined longitudinally thereof. Fastener receiving holes are defined in shoulders 216 and 218 of the plate 210, and fasteners, such as screws 220, or the like, attach the plate 210 to the base 200 via threaded holes defined in that base.

As shown in FIGS. 2, 3 and 6-8, the gauge leaf 110 is sandwiched between the mounting base 200 and the seating plate 210 to extend into the channel 206 so that feeler 122 of that leaf is remote from that base and is unsupported. The leaf has the gauges mounted on surface 230 thereof which is oriented to face inwardly of the housing and away from the direction the feeler 122 is bent. Surface 230 thus engages the crown bar 204 at a location between the mounting base 200 and the bent end 120. The feeler 122 of the leaf contacts the rod R to define a first degree lever having the force applied to the feeler 122 by the deflecting rod R and the resisting force applied to the other end of the leaf by the base and the seating plate and the fulcrum thereof located between such ends. Any deflection of the rod R is thus multiplied due to a lever effect, and is illustrated in FIG. 7 by the arrow RD. The channel 206 thus permits movement of the leaf. The notches 124 of the leaf 110 accommodate the fastening means, and the strain gauges are located adjacent the location on the leaf which will be adjacent the crown bar in the assembled unit.

Strap accommodating slots 260 and 262 are defined in the mounting section adjacent the base 200 to receive the straps 16 for attaching the device 10 to the rod R.

As discussed in the referenced patent, and in textbooks, the sensitivity of the strain gauges can be adjusted to any desired level. By adjusting the knob 156, such sensitivity can be set so a fisherman is alerted at the proper moment. This proper moment is selected by the fisherman according to his own desires.

Furthermore, rod deflection can be zeroed out. That is, if the rod will normally be deflected, this deflection can be accounted for by the sensitivity adjusting means. For example, if the fishing rod is used in a trolling operation, the rod will be deflected prior to any fish striking a hook. Such strike will add deflection to the deflection caused by the trolling operation itself. The alerting device 10 can be adjusted via the knob 156 and the potentiometer associated therewith to "ignore" the trolling deflection and activate the signalling means only when a predetermined amount of deflection occurs in addition to the trolling induced deflection. Other "zeroing" type situations will occur to those skilled in the art based upon the present disclosure, and these other situations will also be within the scope of the present invention.

It is also seen that the inward orientation of the gauges on leaf 110, along with the closed housing 12, protects the elements of the alerting device from environmental conditions which might otherwise be detrimental to the performance of the unit.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative

I claim:

1. A device for use in fishing comprising:
   self-contained means mountable on different fishing rods of various types and sizes for signalling when a fish has struck including as follows;
   a housing detachably mounted on a fishing rod at a selected position;
   attaching means detachably mounting said housing on the fishing rod;
   fishing rod deflection monitoring means directly mounted on said housing and including a strain gauge; and means contacting the fishing rod and transferring fishing rod deflection to said strain gauge in a manner which causes said strain gauge to react to such rod deflection and said strain gauge being mounted on said rod contacting means;
   alerting means to be activated by said strain gauge when a predetermined amount of fishing rod deflection has occurred; and
   circuit means connecting said alerting means to said strain gauge and to a power source;
   said housing protecting said deflection monitoring means from environmental conditions which may cause said monitoring means to inconsistently sense rod flexure.

2. The device defined in claim 1 wherein said rod contacting means includes an elongate mounting plate having one end thereof bent to contact the fishing rod.

3. The device defined in claim 2 wherein said housing includes a projection contacting said mounting plate to amplify any deflection of said plate caused by deflection of the fishing rod.

4. The device defined in claim 1 wherein said alerting means includes an audio indicator.

5. The device defined in claim 1 wherein said alerting means includes a visual indicator.

6. The device defined in claim 1 further including a sensitivity adjusting means for controlling said circuit means so that different amounts of rod flexure can be selected for causing said deflection monitoring means to complete said circuit to activate said alerting means.

7. The device defined in claim 1 wherein said deflection means includes a plurality of orthogonally arranged strain gauges.

8. The device defined in claim 6 wherein said sensitivity adjusting means includes an on-off switch.

9. The device defined in claim 1 wherein said housing is hollow and includes a partition separating said circuit means from the power source.

10. The device defined in claim 1 wherein said attaching means includes straps.

11. The device defined in claim 3 wherein another end of said plate is secured to said housing.

12. A strike signalling means for use in fishing comprising:
    a housing detachably mounted on a fishing rod at a selected position;
    attaching means detachably mounting said housing on the fishing rod;
    fishing rod deflection monitoring means mounted on said housing and including a strain gauge and means contacting the fishing rod and transferring fishing rod deflection to said strain gauge in a manner which causes said strain gauge to react to such rod deflection;
    alerting means to be activated by said strain gauge when a predetermined amount of fishing rod deflection has occurred;
    circuit means connecting said alerting means to said strain gauge and to a power source;
    said housing protecting said deflection monitoring means from environmental conditions which may cause said monitoring means to inconsistently sense rod flexure;
    said rod contacting means including an elongate mounting plate having one end thereof bent to contact the fishing rod;
    said housing including a projection contacting said mounting plate to amplify any deflection of said plate caused by deflection of the fishing rod;
    another end of said plate being secured to said housing;
    said projection being located on said housing to be between said plate bent end and said plate another end so that said plate bends over said projection when said plate bent end is moved by deflection of the fishing rod.

13. The signalling means defined in claim 12 wherein said projection includes a crown bar extending transversely of said plate.

14. The device defined in claim 1 wherein said attaching means includes a rod seating plate having a channel defined therethrough for accommodating the fishing rod.

15. The device defined in claim 1, wherein said rod contacting means includes an elongate mounting plate having a bent portion thereof which extends toward the fishing rod.

16. The device of claim 15, wherein said housing further includes seating means for accommodating fishing rods of various diameters.

17. A fishing device comprising: means for signalling a fish strike mountable on different fishing rods of various types and sizes including; a protective housing, means for detachably attaching said housing to a fishing rod at a chosen position thereon, alerting means contained in said housing, energizing and control means connected to said alerting means and responsive to rod deflection, and rod deflection monitoring means mounted directly on said housing, said monitoring means having a leaf member fastened cantilever fashion to the housing at one end and having a deflectable tip at the other end, a projection on said housing engageable with said leaf between the two ends thereof, and strain gauge means mounted on said leaf adjacent said projection.

18. A fishing device as set forth in claim 17, further including a fishing rod engaging seating plate with rod receiving channel therein attached to said housing at the position where the leaf end is fastened by fastening means and which is used in part to hold the fixed end of the leaf fastened to the housing.

19. A fishing device as set forth in claim 18, wherein said leaf has notches in the fixed end thereof, said notches cooperating with the fastening means for assuring proper positioning of the leaf with strain gauge means thereon relative to the housing projection.

20. A fishing device as set forth in claim 19, further including fishing rod fastening straps provided through slots in the housing closely adjacent the leaf fixed end fastening structure for attaching the device to fishing rods of various diameters.

* * * * *